Feb. 27, 1968   W. C. JACKSON ET AL   3,371,260
TOOTHBRUSH SUPPORT WITH RECHARGER STAND
Filed June 15, 1965                      2 Sheets-Sheet 1
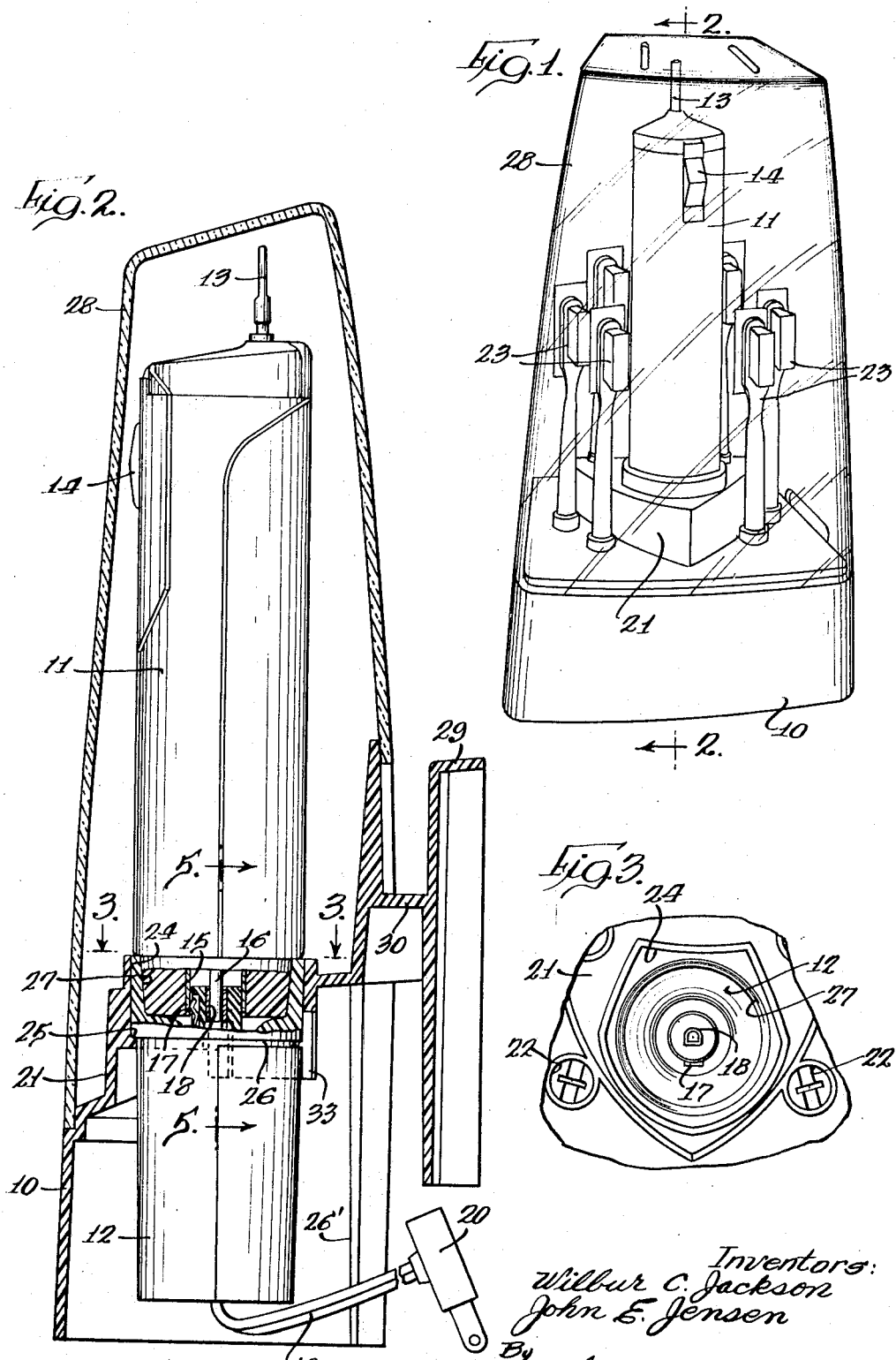
Inventors:
Wilbur C. Jackson
John E. Jensen
By George R. Clark
Atty

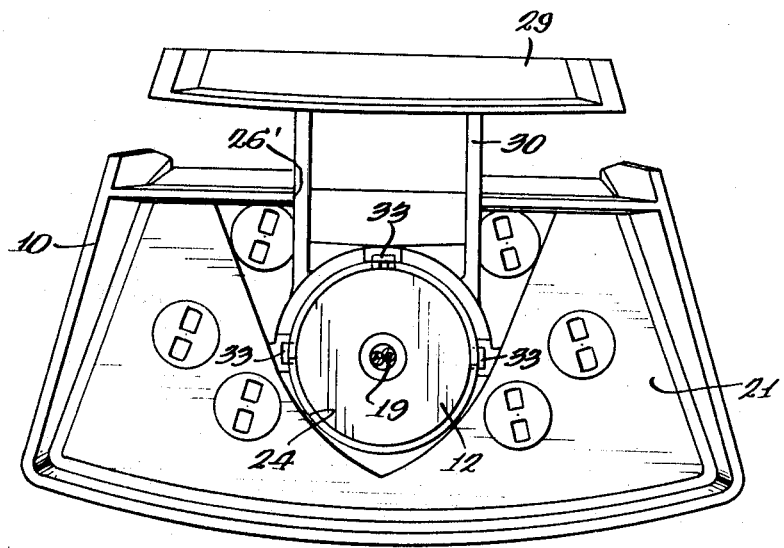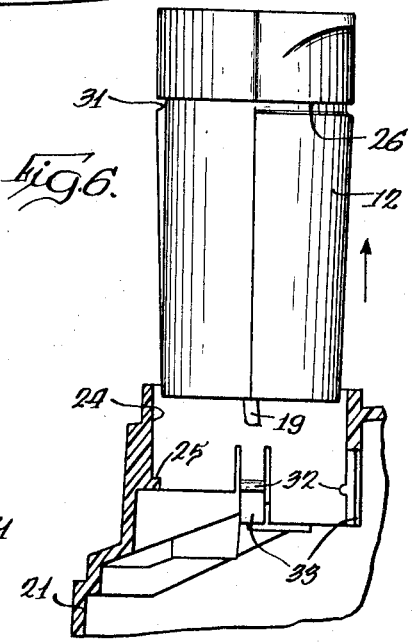

United States Patent Office 3,371,260
Patented Feb. 27, 1968

3,371,260
TOOTHBRUSH SUPPORT WITH
RECHARGER STAND
Wilbur C. Jackson, Wheaton, and John E. Jensen, Des Plaines, Ill., assignors to Sunbeam Corporation, Chicago, Ill., a corporation of Illinois
Filed June 15, 1965, Ser. No. 464,089
5 Claims. (Cl. 320—2)

ABSTRACT OF THE DISCLOSURE

The recharger of the support and recharging stand for an electric toothbrush is a self-contained and quickly removable unit for travel purposes.

This invention relates to a support and recharging stand for rechargeable battery operated electric appliances such as an electric cordless toothbrush.

In the electric cordless toothbrush art it is well known to provide a support recharging stand. The power handle of the toothbrush contains a rechargeable battery and the stand contains a recharger for recharging the battery from an electric wall outlet. The stand is adapted to be mounted on a wall in the bathroom or it can be rested on a horizontal surface. The cord extends from the recharger to the wall outlet but is not connected to the power handle. That is to say, in use the power handle for the toothbrush is removed from the recharger and its electric cord. The power handle conventionally comprises a rechargeable battery, a motor, and transmission means to drive the toothbrush. The power handle is sealed against the entrance of water, and operates off the low voltage of the rechargeable battery. After use the power handle is placed back on the stand so that the battery is recharged to full capacity. The recharger conventionally comprises a voltage step down transformer and a half wave rectifier. The electric extension cord is connected to the high voltage side of the recharger, and the low voltage side of the recharger is adapted to be connected to the battery in the power handle. For purposes of connecting the power handle to the recharger a pair of electric contacts are provided on the stand and one end of the power handle.

The electric toothbrush as above described has turned out to be a very popular appliance. However, its use has been restricted mostly to in the home. This is because most often the stand is permanently fastened to a wall of the bathroom. Therefore, it has not been suitable for travel purposes. This is true even if the stand isn't fastened to a wall but merely rested on a horizontal surface in the bathroom. This is because the stand is too large or inconvenient to take on trips.

It is one object of this invention to provide a support and recharging stand for cordless rechargeable battery operated electric appliances which makes the appliance suitable for travel.

In one form of the invention an electric toothbrush is provided with a support and recharging stand wherein the recharging unit in the stand is self-contained and quickly removable from the stand. Thus, beside using the appliance in its conventional manner in the home, the recharger and toothbrush can be removed from the stand for travel purposes.

The invention will be better understood by considering the following description taken in connection with the accompaying drawings, and its scope will be pointed out in the appended claims.

In the drawings, FIG. 1 is a perspective view of one form of the invention;

FIG. 2 is an enlarged sectional view taken along the section line 2—2 of FIG. 1;

FIG. 3 is a partial top view taken along the line 3—3 of FIG. 2 with the power handle removed;

FIG. 4 is a bottom view of the device;

FIG. 5 is an enlarged sectional view taken along the section line 5—5 of FIG. 2; and FIG. 6 is a view similar to that of FIG. 2 but with the recharger removed.

Illustrated in the drawings is a cordless battery operated rechargeable electric toothbrush and support and recharging stand therefor. The stand 10 suports a power handle 11 and a recharger 12. The details of the electrical and mechanical components inside the power handle 11 and recharger 12 will not be described since this is not necessary for a clear understanding of the invention. These details are already present in electric toothbrushes currently available on the market, and are also described in copending patent application Ser. No. 353,327 by Albert R. Spohr for Electric Cordless Toothbrush filed Mar. 20, 1964, and assigned to the same assignee as the instant application. As will be understood by those skilled in the art, the power handle 11 contains a not shown direct current rechargeable battery, a motor, and transmission means to drive a toothbrush coupling 13. An on-off switch 14 is provided at the upper end of power handle 11 and a pair of spaced electric contacts 15 and 16 are provided at the lower end of the handle 11. The recharger comprises a not shown voltage step down transformer and half wave rectifier, a pair of spaced electric contacts 17 and 18, and an electric power cord 19 having a plug 20 to connect the recharger to an alternating current wall outlet. The pairs of contacts 15, 16 and 17, 18 are for the purpose of electrically connecting the recharger 12 and power handle 11 together to recharge the latter's battery.

The handle 11 and recharger 12 are removable self-contained units enclosed in generally elongated cylindrical housings as illustrated. The stand 10 is hollow and is open at its bottom and has a top wall 21. The top wall has a plurality of recess 22 formed therein for supporting toothbrushes 23. Top wall 21 also has a circular opening 24 formed therein. The recharger 12 is vertically disposed in opening 24. In the position shown in FIG. 2 the recharger 12 is positioned inside stand 10 and its upper end is nested or seated in opening 24. The recharger 12 is removably suspended in stand 10 by virtue of shoulders 25 and 26 formed in the opening 24 and on the upper end of the recharger 12 respectively.

The cord 19 extends out of the open bottom of stand 10 or it can extend rearwardly thereof through a slot 26' formed in the rear thereof. The contacts 17, 18 are actually located inside a cavity or recess 27 formed in the upper end of the recharger housing. The cavity 27 faces upwardly and is adapted to nest or seat the lower end of the handle 11 to hold it in vertical position and assist in retaining the contacts 15, 16 and 17, 18 engaged. The stored handle 11 and brushes 23 are covered by a removable cover 28 for stand 10.

The stand 10 can be set on a horizontal surface. In such event the cord 19 would come from out the bottom of stand 10 through the slot 26'. At the rear of the stand 10 a wall mounting bracket portion 29 is provided for purposes of mounting the stand on a wall of the bathroom. Portion 29 is spaced from stand 10 by an interconnecting portion 30 integral with stand 10 and portion 29. The rear of stand 10 and portions 29, 30 in effect provide a spool for coiling the cord 19 in stored position on the stand. For example, when plug 20 is plugged into a wall socket if there is an excess length of cord it can be coiled stored on portion 30.

When one desires to take the toothbrush on a trip it is not necessary to take stand or rack 10 or to remove it from its wall mounting. The recharger 12 is removable from within opening 24 and so also is the cord 19. Therefore, for travel purposes only the recharger 12 and its connected cord 19 need be taken with the power handle 11 and one or more of the brushes 23. Upon returning from the trip the recharger 12 is merely returned to its position in the stand 10.

In normal home use the recharger 12 isn't lifted out of position when the handle 11 is raised. This is because detachable latching means is provided to normally retain recharger 12 in opening 24. The detachable latching means comprises notches or grooves 31 formed on the upper end of recharger 12 and lugs 32 which are adapted to snap therein. Lugs 32 are integrally formed on depending resilient fingers 33. Fingers 33 are integral with the top wall 21 along the opening 24. These fingers 33 are formed of plastic, as is the stand or rack 10, and in order to unlatch the recharger it is merely necessary to push upwardly on the recharger from the bottom thereof. The force required to unlatch the recharger is greater than the force required to disengage the contacts 15, 16 and 17, 18 and withdraw the power handle 11 from its seated position in cavity 27. Thereof, when the power handle 11 is raised in normal use thereof the recharger is not accidently removed from the stand or rack 10.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. A rechargeable battery operated appliance comprising a rechargeable battery operated power handle, a stand for storing and recharging said power handle, a recharger having a housing which is removably supported in said stand, said stand comprising a hollow stand member having a top wall with an opening formed therein, said recharger housing being removably positioned within said hollow stand member in alignment with said opening, a power cord connected to said recharger and being removable from said stand, said power handle being elongated and having a first pair of electrical contacts on one end thereof, an upwardly facing recess formed in said recharger, a second pair of electrical contacts supported on said recharger and disposed in said recess, said recess being adapted to nest said power handle one end with said power handle extending vertically and said first and second pairs of contacts in engagement for charging purposes.

2. The combination of claim 1 wherein said power cord is connected to said recharger at a point remote from said recess, said cord extending from said recharger to the exterior of said hollow stand member for connection to a source of power, and integral shoulder means formed on said top wall about said opening and on said recharger housing for removably supporting said recharger within said hollow stand member.

3. The combination of claim 1 wherein said power cord is connected to said recharger at a point remote from said recess, said hollow stand member being formed with an open bottom, said cord extending from said recharger to the exterior of said hollow stand member through said open bottom, and a wall mounting bracket for said stand, said bracket being spaced from said stand by an interconnecting portion connecting said stand and bracket together in spaced relationship to provide a cord storage spool for coiled storage of said cord about said interconnecting portion.

4. In the improvement of claim 1, wherein said cord is connected to said recharger at a point remote from said recess, said cord extending from said recharger to out of said stand member, and integral shoulder means formed on said top wall about said opening and on said recharger housing for removably supporting said recharger within said hollow stand member off said top wall.

5. A rechargeable battery operated appliance comprising a rechargeable battery operated power handle, a stand for storing and recharging said power handle, a recharger having a housing which is removably supported in said stand, said stand comprising a hollow stand member having a top wall with an opening formed therein, said recharger housing being removably positioned within said hollow stand member in alignment with said opening, a power cord connected to said recharger and being removable from said stand, said hollow stand member having an open bottom, said power cord extending from said recharger to the exterior of said hollow stand member through its open bottom, means formed on said top wall and supporting thereon a plurality of tooth brushes which are adapted to be drive connected to said power handle, a removable cover on said stand for covering said tooth brushes and said power handle, and latch means retaining said recharger removably positioned in said hollow stand member, said latch means being adapted to be manually operated to release said recharger from said stand for removal of said recharger from said stand, and a cord storage spool integrally formed on said stand for coiled storage of said cord.

References Cited
UNITED STATES PATENTS

| | | | |
|---|---|---|---|
| 2,540,841 | 2/1951 | Stancu | 320—59 |
| 2,608,294 | 8/1952 | Ward | 312—206 X |
| 3,143,697 | 8/1964 | Springer | 320—2 |
| 3,194,621 | 7/1965 | Frost | 312—209 X |
| 3,281,636 | 10/1966 | Fleckenstein et al. | 320—2 |
| 3,287,076 | 11/1966 | Spofford | 312—206 |

JOHN F. COUCH, *Primary Examiner.*

WARREN E. RAY, *Examiner.*

S. WEINBERG, *Assistant Examiner.*